United States Patent
Brooke

[15] 3,669,205
[45] June 13, 1972

[54] VEHICLE GUIDANCE SYSTEMS

[72] Inventor: David W. I. Brooke, Wallingford, England

[73] Assignee: International Harvester Company of Great Britain Limited, London, England

[22] Filed: May 19, 1971

[21] Appl. No.: 145,006

Related U.S. Application Data

[63] Continuation of Ser. No. 865,932, Oct. 13, 1969, abandoned.

[30] Foreign Application Priority Data

Oct. 16, 1968 Great Britain.....................49,141/68

[52] U.S. Cl...............................180/98, 318/587, 318/608, 180/791
[51] Int. Cl.......................................................B60k 27/00
[58] Field of Search................180/98, 79.1; 318/587, 608; 200/1 V

[56] References Cited

UNITED STATES PATENTS

| | | | |
|---|---|---|---|
| 3,132,710 | 5/1964 | Petrella et al. | 180/79.1 |
| 3,468,391 | 9/1969 | Rushing et al. | 180/98 |
| 931,242 | 8/1909 | Williams et al. | 200/1 V |

Primary Examiner—Benjamin Hersh
Assistant Examiner—John P. Silverstrim
Attorney—Noel G. Artman

[57] ABSTRACT

A magnetic sensing head arrangement for guiding a vehicle incorporates a pair of detectors so connected as to give a difference output as a result of a received electromagnetic signal, and a single detector positioned between them. By applying the difference signal from the two detectors and the output from the single detector alternately as the signal input and the reference input to a phase sensitive detector the vehicle may be guided to follow a path either directly over a guide wire or midway between two guide wires which carry the same current in opposite directions.

10 Claims, 5 Drawing Figures

INVENTOR
DAVID W. I. BROOKE

INVENTOR
DAVID W. I. BROOKE

VEHICLE GUIDANCE SYSTEMS

This is a continuation of application Ser. No. 865,932, filed Oct. 13, 1969, now abandoned.

This invention relates to vehicle guidance systems and more particularly to a magnetic sensing head arrangement for indicating lateral deviations of a sensing head from a desired path in relation to a system of the kind known as a leader cable system.

A leader cable system employs energized guide wires which give out an electromagnetic signal, and the magnetic sensing head arrangement on a vehicle picks up the emitted signal and makes use of it to determine the relationship between the sensing head and the guide wire, so that the vehicle can be caused to follow a desired path preferably by a feedback to a steering system in response to identification of a deviation from the desired relationship to the guide wire.

In most leader cable systems it is arranged that the sensor is maintained approximately above the guide wire in the region where the electromagnetic field is horizontal. In such a system, however, the number of guide wires which have to be provided in order to enable a guided vehicle to traverse the whole of an area is very large as there has to be one guide wire for every single path or traverse of the vehicle.

It is a main object of the present invention to provide a magnetic sensing head arrangement for use on a guided vehicle in order to reduce the number of guide wires which have to be laid when the vehicle is required to traverse a number of parallel paths so as to cover a whole area.

According to the present invention there is provided a magnetic sensing head arrangement for indicating lateral deviations of the sensing head from desired paths in relation to a plurality of substantially parallel energized wires comprising first and second magnetic detectors horizontally spaced from one another in a lateral direction and disposed with their magnetic axes substantially vertical, a third magnetic detector disposed with its magnetic axis substantially vertical and located in the vicinity of the first and second detectors, the output from the first and second detectors being connected in phase-opposition when the direction of the axial component of the magnetic fields is the same in both the first and second detectors to produce a resultant output dependent on the algebraic sum of the voltages induced in the first and second detectors, a phase sensitive detector to which the resultant output from the first and second detectors and the output of the third detector are connected via a switching device capable of feeding either the resultant output as a reference input to the phase sensitive detector and the output of the third detector as a signal input to the phase sensitive detector, or of feeding the resultant output as a signal input to the phase sensitive detector and the output of the third detector as a reference input to the phase sensitive detector, whereby the phase sensitive detector will give an output indicative of lateral deviations of the sensing head from a vertical plane containing the line of an energized wire or from a vertical plane midway between two energized wires respectively.

For effective operation the two energized wires should always be outgoing and return wires in the same circuit.

It will be appreciated that the use of a magnetic sensing head arrangement in accordance with the invention reduces by approximately half the number of guide wires which are required for the completion of any given pattern of movement of the guided vehicle over a desired area.

The detectors need not be precisely vertical, nor need they be exactly parallel to one another.

Advantageously the first, second, and third detectors are coils having their magnetic axes substantially vertical. In the embodiments of the invention which will be described the third coil is located so that its magnetic axis lies substantially midway between the first and second coils, but it need not be located between the first and second coils, provided that it is in the vicinity of those coils.

Advantageously the first and second magnetic coils are connected in phase-opposition in a single tuned circuit.

In one embodiment of the invention which will be described there is additionally provided means for effecting a comparison between the resultant output from the first and second detectors and the output of the third detector, means for varying the proportions of the said outputs employed in the comparison, and means for applying the result of the said comparison as a signal input to the phase sensitive detector when the output from the third coil is applied to the phase sensitive detector as a reference input.

Conveniently the means for effecting the comparison and the means for varying the proportions are comprised by a potentiometer having a series of tapping points any one of which may be selected by operation of a contact.

In order that the invention may be more fully understood the following detailed description is made, by way of example, with reference to the accompanying drawings, in which.

Figure 5:
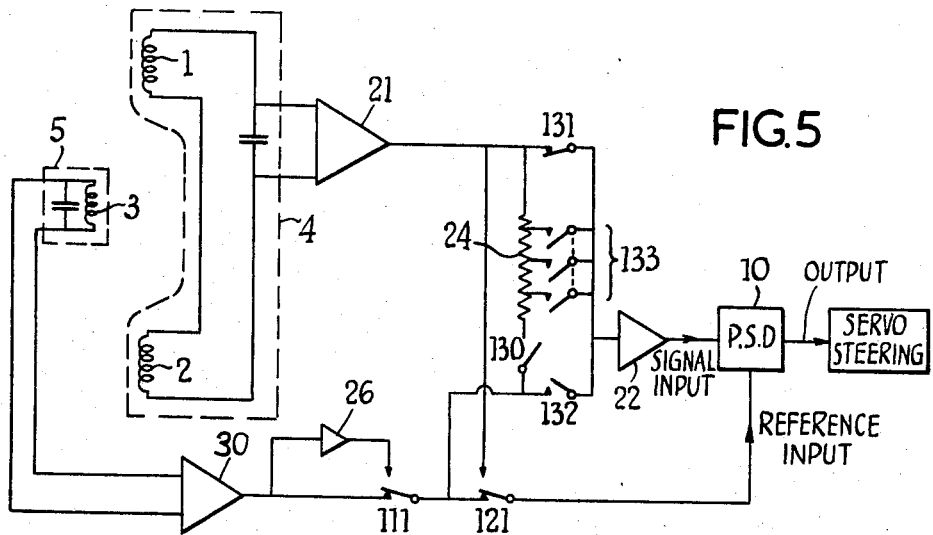
Figure 4:
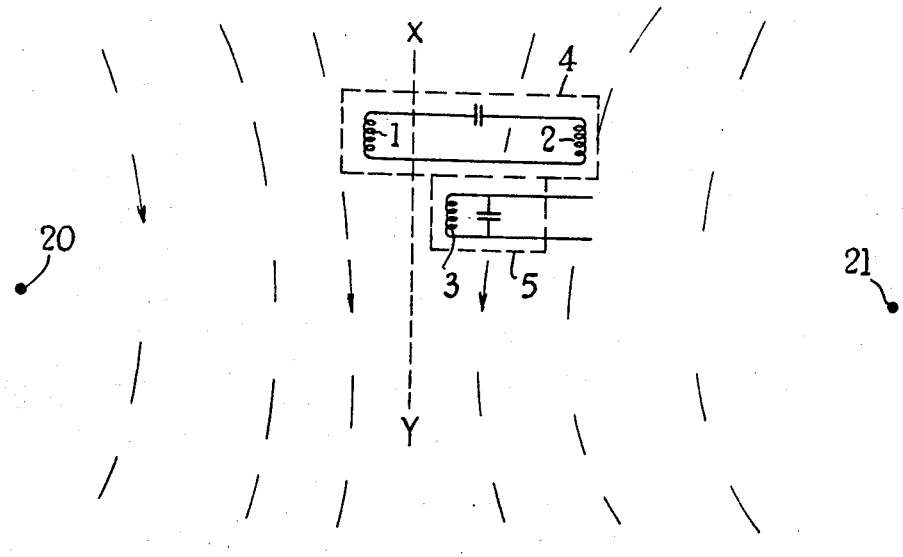

FIG. 4 shows the third magnetic coil of FIG. 1 in a position above and between two energized wires which corresponds to a second mode of operation of the magnetic sensing head arrangement in accordance with this invention; and FIG. 5 shows a circuit in accordance with the present invention modified so as also to be capable of operation to guide a vehicle in the manner hereinafter described and further described and claimed in my copending application Ser. No. 865,931 filed simultaneously herewith.

DESCRIPTION OF THE PREFERED EMBODIMENT

In the drawings the same or similar parts are designated by like reference numerals.

Figure 1:
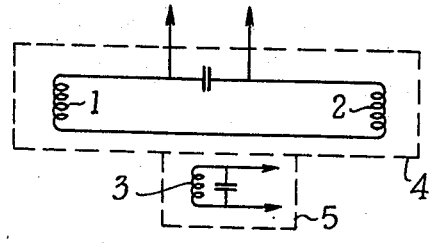
FIG. 1 shows an arrangement of three magnetic coils for a magnetic sensing head in accordance with this invention.
Figure 2:
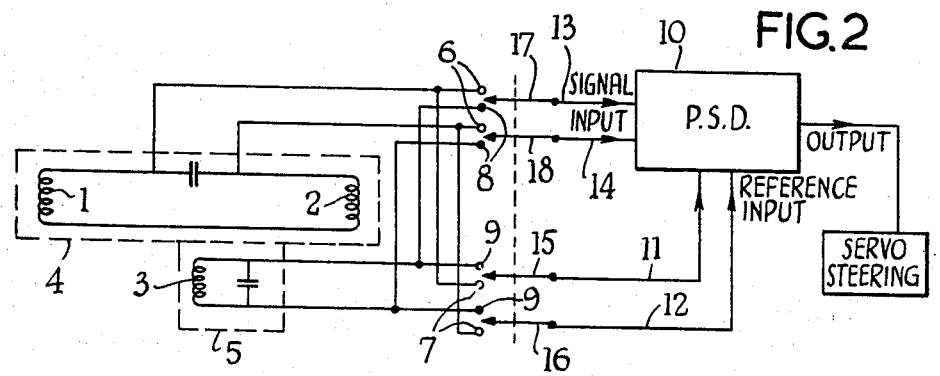
FIG. 2 is a block schematic diagram of the whole magnetic sensing head arrangement in accordance with this invention.

Referring particularly to FIGS. 1 and 2 of the drawings, the magnetic sensing head arrangement in accordance with the invention includes three magnetically sensitive coils, of which first and second magnetic coils 1 and 2 are spaced horizontally from one another and are arranged with their magnetic axes vertical. The distance by which the first and second coils 1 and 2 are separated is preferably a distance not greater than the width of the vehicle upon which the magnetic sensing head arrangement is mounted. A third coil 3 is located in the vicinity of the first and second coils 1 and 2, and is disposed with its magnetic axis vertical and midway between the axes of the coils 1 and 2.

Each of the coils 1, 2 and 3 may be tuned individually by a respective capacitor, but advantageously the first and second coils 1 and 2 form part of the same tuned circuit 4 which is tuned by a single capacitor. The advantage of a single tuned circuit is that the difference signal obtained is less affected by variations in the characteristics of the individual coils 1 and 2. The coils 1 and 2 are connected in the circuit 4 in such a sense that the voltages induced in the respective coils are in phase-opposition when the sense of the electromagnetic field is the same in each coil. The third magnetic coil 3 has its one separate tuned circuit denoted by the reference numeral 5.

The magnetic sensing head arrangement as shown in FIG. 2 has the output from tuned circuit 4, which is the resultant output of the voltages induced in coils 1 and 2, connected to two pairs of terminals 6 and 7, while similarly the output from the tuned circuit 5, which is the voltage induced in the coil 3, is connected to two pairs of terminals 8 and 9.

A phase sensitive detector 10 has reference input lines 11 and 12 and signal input lines 13 and 14. The input lines 11, 12 and 13, 14 are connected respectively to switch contacts 15, 16 and 17, 18 which are operable together from respective upper positions to respective lower positions. When the switch contacts 15, 16 and 17, 18 are in the upper position, the resultant output from the tuned circuit 4 is connected as a signal input to the phase sensitive detector 10 and the output from the tuned circuit 5 is connected as the reference input to the phase sensitive detector 10. Correspondingly, when the switches are operated to the lower positions of contacts 15, 16 and 17, 18, the resultant output from the tuned circuit 4 is connected as the reference input along input lines 11 and 12 to the phase sensitive detector 10, and the output of the coil 3 in tuned circuit 5 is connected to the signal input lines 13, 14 of the phase sensitive detector 10.

Figure 3:
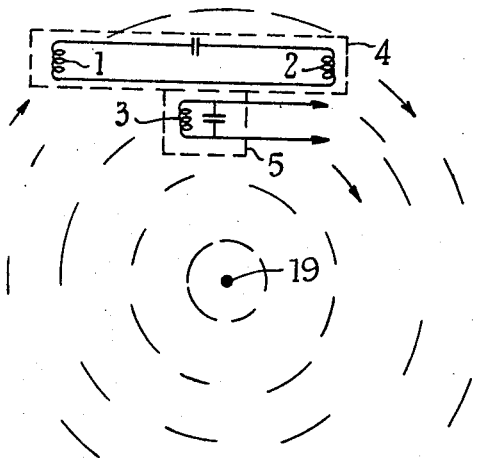
FIG. 3 shows the three magnetic coils of FIG. 1 in a position above an energized wire, and this corresponds to one mode of operation of the magnetic sensing head arrangement of this invention.

Each of the coils 1, 2, and 3 produces an output voltage dependent upon the component along its axis of the electromagnetic field of guide wire 19. In FIG. 3 the coils 1, 2, and 3 of the magnetic sensing head arrangement are shown in a position approximating to the desired position in relation to the guide wire 19 when the tuned circuit 4 is connected to the reference input lines 11 and 12 of the phase sensitive detector 10, and the tuned circuit 5 including the coil 3 is connected to the signal input lines 13 and 14 to the phase sensitive detector 10.

The voltage induced in the tuned circuit 5 will be zero when the coil 3 is in a position where there is no component of the magnetic field in the direction of the axis of the coil. Because the axis of the coil 3 is vertical this will occur when the field is horizontal, i.e., when the coil 3 is approximately vertically above the energized wire 19. The exact position in which the field is horizontal may vary slightly from the vertical position above the energized wire 19 on account of the distorting effect of neighboring energized guide wires.

The position in which the field is horizontal is called the null position, and is the position which the guided vehicle will be caused to adopt. When the head is displaced laterally from the null position, the coil 3 will be at a point where the vertical component of the field is not zero, so that a voltage will be induced in the coil 3 and the magnitude of this voltage induced in the coil 3 will depend upon the amount of lateral displacement of the magnetic sensing head arrangement from the null position. Furthermore, the phase of the voltage induced in the coil 3 when it is displaced to the left of the null position will differ by 180° from the phase of the voltage induced when the coil 3 is displaced to the right of the null position.

The voltages induced in the coils 1 and 2 of tuned circuit 4 will be in phase with one another in the position of the magnetic sensing head arrangement shown in FIG. 3, and the induced voltages will be of the same phase whichever direction of displacement from the null position occurs. The resultant output voltage from the tuned circuit 4 is thus suitable to provide a reference phase for application to the phase sensitive detector 10, while the output from tuned circuit 5 which is applied as a signal input to the phase sensitive detector 10 indicates unambiguously the direction of deviation from the null position. Consequently the D.C. output voltage of the phase sensitive detector 10 will be of a magnitude dependent upon the displacement of the magnetic sensing head arrangement from its null position and will have a sign dependent upon the direction of the displacement.

This D.C. output voltage may be used to control the steering of a vehicle, for example by application to a servo steering mechanism as shown in FIG. 2, in such a way as to maintain the magnetic sensing head arrangement in the null position above the energized guide wire 19.

Referring now to FIG. 4, the magnetic sensing head arrangement is shown in a position midway between two energized guide wires 20 and 21, of which guide wire 21 is a return wire in the same circuit as guide wire 20. When the vehicle carrying the magnetic sensing head arrangement is desired to follow a path midway between two energized guide wires, the switch contacts are changed over so that the resultant output from the tuned circuit 4 is applied as the signal input along lines 13 and 14 to the phase sensitive detector 10, and the output from the tuned circuit 5 is applied as the reference input along lines 11 and 12 to the phase sensitive detector 10.

In the region midway between the energized guide wires 20 and 21 the electromagnetic field is substantially vertical and is symmetrical about the vertical plane which contains the line $x$–$y$ which is midway between the two energized wires 20 and 21. Consequently the voltage induced in tuned circuit 5 including the coil 3 will be of constant phase and will be of substantially constant strength for displacements to either side of the line $x$–$y$. On the other hand, the net voltage induced in tuned circuit 4 will be zero when the coils 1 and 2 are situated an equal distance on either side of the line $x$–$y$, so that this is the null position in this use of the magnetic sensing head arrangement.

When the magnetic sensing head arrangement is displaced from this null position the electromagnetic fields acting in coils 1 and 2 will not be equal, and there will be a resultant output voltage from tuned circuit 4 dependent upon the magnitude of the displacement. The phase of the voltage induced in the tuned circuit 4, when it is displaced to the left of the null position, will differ by 180° from the phase of the voltage induced when the magnetic sensing head arrangement is displaced to the right of the null position.

Therefore in this arrangement the D.C. output voltage of the phase sensitive detector 10 will again be of a magnitude dependent upon the amount of the displacement of the sensing head arrangement and of a sign dependent upon the direction of this displacement. Accordingly the D.C. output voltage of the phase sensitive detector 10 is again capable of being used in such a way as to control the steering of the vehicle to bring the magnetic sensing head arrangement back to the null position, with the result that the magnetic sensing head arrangement on the vehicle is maintained midway between the two energized wires 20 and 21, and the vehicle is caused to follow this path midway between the two energized wires 20 and 21.

The coils 1 and 2 may be placed so that a line joining them is oblique to the direction of motion, but it will be understood that the coils must always have a lateral spacing, i.e., a component of spacing normal to the direction of motion.

The present invention also comprehends a method of guiding a vehicle in alternative paths substantially as described above but simply reversing the connections to the signal input and reference input of the phase sensitive detector rather than by employing an actual switching device.

In addition to providing a method of traversing an area by paths which are alternately above and midway between longitudinal sections of a guide wire, the present invention also provides a magnetic sensing head arrangement which has a flexibility of choice in a manner of guiding the vehicle along one particular path.

For example, in a system of automatic vehicle guidance for agricultural purposes, it may be required to guide a vehicle automatically from its garage along a farm lane to a particular field in which a series of traverses is to be effected for cultivation purposes. The magnetic sensing head arrangement which has been described may be caused to guide the vehicle up such a farm lane irrespective of whether the guidance signal for guiding the vehicle along the lane is supplied by a single wire laid in a path along the middle of the lane, or whether the guidance signal is provided by two wires laid respectively at opposite sides of the farm lane. In most cases it will be preferable for the guidance to be effected along a path midway between two wires which are either laid in the hedges at opposite sides of the lane or are buried off the vehicle track near the sides of the lane, rather than to guide the vehicle using a single wire which would have to be buried in the center of the lane.

The magnetic sensing head arrangement of this invention can be used in a circuit so as to control the traverse in the field by the method described and claimed in my aforementioned copending application.

The method described in my aforesaid copending application enables an even greater reduction in the wire length which is used to effect the traverse of an area than can be achieved using the magnetic sensing head arrangement described in FIG. 2 of the accompanying drawings.

In FIG. 5 of the accompanying drawings there is shown a modified version of the magnetic sensing head arrangement in accordance with this invention, which is capable of guiding a vehicle along different paths of constant gradient of magnetic field, these paths being offset by different lateral distances from a single guide wire. Referring to FIG. 5, the tuned circuits 4 and 5 which include the coils 1, 2, and 3 are shown as being connected to the phase sensitive detector 10 by a contact arrangement involving contacts 121, 131, and 132. In the position of these three contacts shown in FIG. 5 the output from the tuned circuit 5 including the coil 3 is connected via an amplifier 30 and contact 121 as the reference input to the phase sensitive detector 10, and the difference output from the tuned circuit 4 including the coils 1 and 2 is connected via amplifier 21, contact 131 and amplifier 22 as the signal input to the phase sensitive detector 10. Consequently in this position the magnetic sensing head arrangement will act to control the vehicle in a path midway between two guide wires which are carrying current in opposite directions.

If the position of each of the contacts 121, 131 and 132 is now changed, the resultant or difference output signal from the coils 1 and 2 of the tuned circuit 4 will be fed by amplifier 21 and contact 121 as the reference input to the phase sensitive detector 10, and the signal from the coil 3 of tuned circuit 5 will be fed as the signal input to the phase sensitive detector 10 via amplifier 30, contacts 111 and 132, and amplifier 22.

In addition to the apparatus so far described, the circuit of FIG. 5 includes a resistor 24 having a series of tapping points controlled by a selected one of the series of contacts collectively denoted by the reference 133. According to the selection of a particular one of the contacts 133, the magnetic sensing head arrangement may be caused to guide the vehicle along a path offset a desired lateral distance from a guide wire.

Contact 130 is provided so that when this contact is closed the potentiometer constituted by the resistor 24 and the series of contacts 133 is operative. In this condition both contacts 131 and 132 are open and contact 121 is in the closed position shown in FIG. 5.

Therefore the signal from the tuned circuit 5 including the coil 3 is always applied as a reference input via amplifier 30 and contacts 111 and 121 to the phase sensitive detector 10 when the resistor 24 is connected in circuit. The signal from the tuned circuit 5 including the coil 3 is also applied via amplifier 30 and contacts 111 and 130 to the resistor 24, and the resultant output or difference signal from the tuned circuit 4 including coils 1 and 2 is also applied to resistor 24 via amplifier 21.

Resistor 24 therefore acts as a device in which the output signals from the tuned circuits 4 and 5 are compared. This comparison may be effected in any desired ratio of the two output signals by appropriate selection of one of the contacts 133 so that the comparison of the selected ratios of the two output signals is applied via the amplifier 22 as a signal input to the phase sensitive detector 10. Selection of a particular one of the contacts 133 selects a gradient of the electromagnetic field along which the vehicle is to be guided in my aforementioned copending application.

It will be readily understood that, for a particular vehicle guidance system in which the vehicle is guided up the lane by one of the two methods mentioned and then caused to traverse the lines of constant gradient of magnetic field strength, it is necessary to provide switching means for switching the signal input to the phase sensitive detector between only the output of the comparison from the potentiometer and the particular one of the two methods of guiding the vehicle up the lane which is chosen. Preferably the vehicle is guided up the lane between two guide wires so that the output of the tuned circuit 5 which includes the coil 3 is always fed as reference input to the phase sensitive detector 10, and the contact 121 can be dispensed with.

The circuit of FIG. 5 further includes an inversion amplifier 26 which is incorporated selectively in the circuit under control of contact 111 depending upon which side of the center line between two guide wires the vehicle is being guided when it is traversing lines of gradient of magnetic field strength.

I claim:

1. A magnetic sensing head arrangement for indicating lateral deviation of the sensing head from desired paths in relation to a plurality of substantially parallel energized wires comprising first and second magnetic detectors horizontally spaced from one another in a lateral direction and disposed with their magnetic axes substantially vertical, a third magnetic detector disposed with its magnetic axis substantially vertical and located in the vicinity of the first and second detectors, the outputs from the first and second detectors being connected in phase-opposition when the direction of the axial component of the magnetic field is the same in both the first and second detectors to produce a resultant output dependent on the algebraic sum of the voltages induced in the first and second detectors, a phase sensitive detector to which the resultant output from the first and second detectors and the output of the third detector are connected via a switching device capable of feeding either the resultant output as a reference input to the phase sensitive detector and the output of the third detector as a signal input to the phase sensitive detector, or of feeding the resultant output as a signal input to the phase sensitive detector and the output of the third detector as a reference input to the phase sensitive detector, whereby the phase sensitive detector will give an output indicative of lateral deviations of the sensing head from a vertical plane containing the line of an energized wire or from a vertical plane midway between two energized wires respectively.

2. A magnetic sensing head arrangement according to claim 1, wherein the first, second, and third magnetic detectors are coils.

3. A magnetic sensing head arrangement according to claim 2, wherein the first and second coils are connected in phase-opposition in a single tuned circuit.

4. A magnetic sensing head arrangement according to claim 1, wherein the third coil is located so that its magnetic axis lies substantially midway between the first and second coils.

5. A magnetic sensing head arrangement according to claim 1, wherein there is additionally provided means for effecting a comparison between the resultant output from the first and second detectors and the output of the third detector, means for varying the proportions of the said outputs employed in the comparison, and means for applying the result of the said comparison as a signal input to the phase sensitive detector when the output from the third coil is applied to the phase sensitive detectors as a reference input.

6 A magnetic sensing head arrangement according to claim 5, wherein the means for effecting the comparison and the means for varying the proportions are comprised by a potentiometer having a series of tapping points any one of which may be selected by operation of a contact.

7. A magnetic sensing head arrangement according to claim 5, which includes switching means for switching the signal input to the phase sensitive detector between the output from the said comparison and one only of the resultant output from the first and second detectors and the output of the third detector.

8. A magnetic sensing head arrangement according to claim 7, wherein the output of the third detector is always connected as a reference input to the phase sensitive detector and the signal input to the phase sensitive detector is either the resultant output from the first and second detectors or the output from the said comparison.

9. A method of guiding a vehicle under the control of a plurality of substantially parallel energized wires, wherein the vehicle may be guided to follow the path of a guide wire or to follow a path midway between adjacent guide wires by reversing connections to a signal input and a reference input of a phase sensitive detector so that, in the one case, the output of a single detector is applied as a signal input to the phase sensitive detector and a difference output between a separate pair of detector is applied as a reference input to the phase sensitive detector, and, in the other case, the difference signal from the pair of detectors is applied as a signal input to the phase sensitive detector and the output of a separate single detector is applied as a reference input to the phase sensitive detector being utilized to guide the vehicle in the desired path.

10. A magnetic sensing system for indicating lateral deviations from desired paths in relation to a plurality of substantially parallel energized wires, comprising: a magnetic sensing head responsive to magnetic fields produced by energization of the wires, circuit means operable in a first mode to develop an output signal having a polarity indicative of lateral deviation of said sensing head from a path in predetermined relation to a vertical plane containing the line of an energized wire and in a second mode to develop an output signal having a polarity indicative of lateral deviation from a vertical plane located between two energized wires, and switch means for selecting between said first and second modes of operation of said circuit means.

* * * * *